United States Patent
Yip et al.

(10) Patent No.: US 6,582,776 B2
(45) Date of Patent: Jun. 24, 2003

(54) METHOD OF MANUFACTURING PHOTO-ALIGNMENT LAYER

(75) Inventors: Wing C. Yip, Chai Wan (HK); Elena K. Prudnikova, Kowloon (HK); Hoi S. Kwok, Kowloon (HK); Vladimir G. Chigrinov, Kowloon (HK); Vladimir M. Kozenkov, Kowloon (HK); Hirokazu Takada, Sakura (JP); Masanobu Fukuda, Okegawa (JP)

(73) Assignees: Hong Kong University of Science And Technology, Kowloon (HK); Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/988,204

(22) Filed: Nov. 19, 2001

(65) Prior Publication Data
US 2002/0098295 A1 Jul. 25, 2002

(30) Foreign Application Priority Data
Nov. 24, 2000 (JP) .......................................... 2000-357309

(51) Int. Cl.$^7$ .............................. C08J 7/18; B05D 3/02; B05D 3/06; B05D 5/06; G02F 1/1337
(52) U.S. Cl. ........................ 427/514; 427/508; 427/553; 427/558; 427/595; 427/162; 427/385.5; 349/124; 349/135; 428/1.2
(58) Field of Search ................................. 427/487, 508, 427/162, 163.1, 163.3, 372.2, 375, 385.5, 514, 520, 553, 558, 595; 252/299.01, 299.1, 299.4, 299.68, 299.67; 349/134, 135, 136, 123, 124; 428/1.1, 1.2, 1.23, 1.25, 1.26, 1.31

(56) References Cited

U.S. PATENT DOCUMENTS

| | | | |
|---|---|---|---|
| 4,974,941 A | 12/1990 | Gibbons et al. | |
| 6,001,277 A | 12/1999 | Ichimura et al. | |
| 6,153,272 A | 11/2000 | Kim et al. | |
| 6,404,472 B1 * | 6/2002 | Andreatta et al. | .......... 252/585 |

FOREIGN PATENT DOCUMENTS

| | | |
|---|---|---|
| JP | 62-159119 | 7/1987 |
| JP | 63-106624 | 5/1988 |
| JP | 8-328005 | 12/1996 |
| WO | WO/0046635 | 8/2000 |

OTHER PUBLICATIONS

European Search Report dated Apr. 26, 2002.

* cited by examiner

*Primary Examiner*—Shrive P. Beck
*Assistant Examiner*—Wesley Markham
(74) *Attorney, Agent, or Firm*—Armstrong, Westerman & Hattori, LLP

(57) ABSTRACT

A photo-alignment layer having excellent long-term stability to light and heat is manufactured by coating a material for the photo-alignment layer, which contains a dichroic dye having two or more polymerizable groups per molecule, on a substrate, and exposing the coating layer to polarized light, thereby imparting a photo-alignment function, and polymerizing the polymerizable groups by heating or light exposure.

7 Claims, No Drawings

METHOD OF MANUFACTURING PHOTO-ALIGNMENT LAYER

BACKGROUND OF THE INVENTION

1. Field of the Invention

The present invention relates to a method of manufacturing a photo-alignment layer used in a liquid crystal display device and, more particularly, to a method of manufacturing a photo-alignment layer, capable of aligning liquid crystal molecules by light exposure, without being subjected to a rubbing treatment.

2. Description of Related Art

In liquid crystal display devices, the state of molecular alignment of liquid crystals is changed by the action of an electric field and a change in optical characteristics attending the change is utilized for display. In general, liquid crystals are used while interposed in the space between two substrates. To align liquid crystal molecules in a specific orientation, the interior surfaces of the substrates are subjected to an alignment treatment.

The alignment treatment is usually performed by a rubbing method in which a layer made of a polymer such as a polyimide is formed on a substrate made of glass, for example, and then rubbed with a cloth in one direction. Consequently, liquid crystal molecules near the substrate are aligned so that their directors become parallel to the rubbing direction. For example, in a twist nematic (TN) cell, two substrates coated with an alignment layer on their interior surfaces face each other between two polarizers whose polarization directions are perpendicular to each other, and the substrates are further arranged so that their rubbing directions are parallel to the polarization direction of their adjacent polarizers, thereby making it possible to form a display which operates based on changes in light transmittance.

Although the rubbing method has the advantage that the manufacturing apparatus has a simple structure, a cleaning process is required after the alignment treatment because dust may adhere during the manufacturing process. Also in TFT liquid crystal cells, which have recently been widely used, TFT previously deposited on the substrate may be destroyed by static electricity which is generated during the rubbing process, thus lowering the manufacturing yield. In the liquid crystal display device, since liquid crystal molecules align in some direction, problems arise, such as viewing-angle dependence in which the display color or contrast varies depending on the viewing angle.

As one method of solving the problem, for example, Japanese Unexamined Patent Application, First Publication No. Sho 62-159119 has proposed a multi-domain method of providing different pretilt angles of the liquid crystal molecules for different regions obtained by dividing each pixel, while Japanese Unexamined Patent Application, First Publication No. Sho 63-106624 has proposed a multi-domain method of providing different alignment directions of the liquid crystal molecules for different regions obtained by dividing each pixel. Such multi-domains are not suited for rubbing alignment method because of the complicated process required.

To solve these problems, there has recently been interest in liquid crystal alignment controlling techniques which do not use rubbing. As non-rubbing alignment techniques, for example, the oblique evaporation method, the LB (Langmuir Blodgett's) layer method, photolithography methods, and photo-alignment methods have been studied. Among these methods, the photo-alignment method, in which a coating layer formed on a substrate is exposed to polarized light to provide a liquid crystal aligning property, is simple. Therefore, the photo-alignment method has been intensively studied. As the photo-alignment method, a method utilizing photoisomerization of a photo-alignment moiety (e.g., an azo group) capable of carrying out a photo-alignment function in organic molecules, a method utilizing photo dimerization of a cinnamoyl group, a coumarin group, or a chalcone group, a method utilizing photocrosslinking of a benzophenone group, and a method utilizing photodegradation of a polyimide resin have been reported.

As the material for the photo-alignment layer, which utilizes photoisomerization, photo dimerization, or photocrosslinking, a polymeric material, in which the photo-alignment moiety is introduced into the side chain or the main chain, is often used to obtain a uniform layer when coated on a substrate made of glass, for example. It is also possible to use a material prepared by using molecules having a photo-alignment property as guest molecules and dispersing them in a host compound consisting of a polymeric compound.

For example, U.S. Pat. No. 4,974,941 discloses a photo-alignment material which can align liquid crystals in a fixed direction to the polarization direction by mixing a dichroic dye with a resin such as polyimide and exposing the mixture to polarized light. However, this photo-alignment material has the problem that the alignment state obtained by exposure to polarized light easily changes by exposure to light having different directions of polarization because the photo-alignment material utilizes cis-trans isomerization of the dichroic dye and is reversible. The photo-alignment layer disclosed in said U.S. patent is unstable and is likely to change its alignment state even by exposure to natural light, and therefore, it is not suited for practical use in a liquid crystal display device. The low-molecular weight dichroic dye included in the photo-alignment layer has the problem that it gradually diffuses into the liquid crystal, and thus the characteristics (e.g., voltage holding ratio) of the liquid crystal display device are likely to be degraded, and also has the problem that the photo-alignment layer loses the liquid crystal alignment capability with the passage of time.

Japanese Unexamined Patent Application, First Publication No. Hei 8-328005 and U.S. Pat. No. 6,001,277 disclose a liquid crystal alignment layer obtained by exposing a film made of a resin having a photoisomerizable structural unit, which exhibits dichroizm, to polarized light. That is, a film made of the resin obtained by coating a resin solution having a structural unit, which exhibits dichroizm, on a substrate is exposed to polarized light, thereby causing alignment, and, furthermore, the state of alignment is fixed by a crosslinking group of the resin.

However, a layer having a structure in which the structural unit, which exhibits dichroizm, is incorporated into the resin has the problem that this structure makes reorientation of the dichroic structural unit by polarized light difficult, thereby it is difficult to obtain sufficient alignment property. Although the problems described above can be solved to some extent with respect to the layer made of a resin having a structural unit in the side chain which exhibits dichroizm, the alignment direction of the structural unit which exhibits dichroizm is not completely fixed, thereby causing the problem that the alignment state of the structural unit is gradually lost by heat and light, and thus the liquid crystal alignment capability cannot be maintained for a long period.

BRIEF SUMMARY OF THE INVENTION

An object to be achieved by the present invention is to provide a photo-alignment layer, which has excellent long-term stability to light and heat.

To achieve the object described above, the present invention provides a method of manufacturing a photo-alignment layer which comprises coating a material for the photo-alignment layer, which contains a dichroic dye having two or more polymerizable groups per molecule, on a substrate, and exposing the coating layer to polarized light, thereby imparting a photo-alignment function, and polymerizing the polymerizable groups by heating or light exposure.

According to the method of manufacturing a photo-alignment layer of the present invention, it is made possible to provide a photo-alignment layer, which has excellent photochemical long-term stability. According to the method of manufacturing a photo-alignment layer of the present invention, a uniform and stable alignment layer can be formed because the material for the photo-alignment layer is coated on the substrate, exposed to polarized light, and then thermally cured or photocured.

DETAILED DESCRIPTION OF THE INVENTION

The material for a photo-alignment layer, which is used in the manufacturing method of the present invention, contains a dichroic dye having two or more polymerizable groups per molecule. In the dichroic dye having two or more polymerizable groups per molecule, the term "dichroic dye" refers to a dye in which a light absorbing property of chromophore varies depending on the direction of an electric vector of polarized light. Examples of the dichroic dye include anthraquinone, azo, quinophthalone, and perylene dyes. Among these dyes, the azo or anthraquinone dye is particularly preferred because it exhibits good photo-alignment properties by exposure to polarized light. Before introducing a polymerizable group, the azo or anthraquinone dye can be used without any specific limitation as far as it can be used as the dichroic dye.

The dichroic dye having a polymerizable group used in the present invention can be easily synthesized by reacting a dichroic dye having a hydroxyl group with carboxylic acid having a polymerizable group, carboxylic acid chloride having a polymerizable group, or a carboxylic anhydride having a polymerizable group according to a publicly known method. The dichroic dye having a hydroxyl group can be easily synthesized by a publicly known method.

The dichroic dye having two or more polymerizable groups per molecule used in the present invention can be easily polymerized by exposure to light or heating, thereby making it possible to fix molecules in the photo-alignment layer, which achieved anisotropy by exposure to polarized light, and to retain anisotropy for a long period, and thus a stable liquid crystal alignment layer can be obtained.

Examples of the polymerizable group include a (meth)acryloyl group, a (meth)acryloyloxy group, a (meth)acrylamide group, a vinyl group, a vinyloxy group, an azide group, a chloromethyl group, and an epoxy group. Among these groups, a (meth)acryloyl group, a (meth)acryloyloxy group, a (meth)acrylamide group, a vinyl group, and a vinyloxy group are preferred because the photopolymerization or thermal polymerization can be conducted comparatively easily, and a (meth)acryloyl group, a (meth)acryloyloxy group, and a (meth)acrylamide group are more preferred.

These polymerizable groups may be combined with the azo or anthraquinone dye via a linker group which may have an ester bond, an ether bond, an imide bond, or an amide bond, such as alkylene group or phenylene group.

Examples of the linker group include straight-chain alkylene groups having 1 to 18 carbon atoms, such as a methylene group, an ethylene group, a trimethylene group, a tetramethylene group, a pentamethylene group, a hexamethylene group, a heptamethylene group, an octamethylene group, a nonamethylene group, a decamethylene group, an undecamethylene group, or a dodecamethylene group; branched alkyl groups having 1 to 18 carbon atoms, such as a 1-methylethylene group, a 1-methyl-trimethylene group, a 2-methyl-trimethylene group, a 1-methyl-tetramethylene group, a 2-methyl-tetramethylene group, a 1-methyl-pentamethylene group, a 2-methyl-pentamethylene group, or a 3-methyl-pentamethylene group; phenylene groups such as a p-phenylene group; and alkoxyphenylene groups having a $C_{1-18}$ straight-chain or branched alkoxyl group, such as a 2-methoxy-1,4-phenylene group, a 3-methoxy-1,4-phenylene group, a 2-ethoxy-1,4-phenylene group, a 3-ethoxy-1,4-phenylene group, or a 2,3,5-trimethoxy-1,4-phenylene group.

The dichroic dye having two or more polymerizable groups per molecule is used alone as the material for the photo-alignment layer, and can also be used in combination with a polymeric material such as polyvinyl alcohol or polyimide.

Among the azo dyes having two or more polymerizable groups per molecule used in the method of manufacturing the photo-alignment layer of the present invention, an azo dye represented by the general formula (1) is preferred:

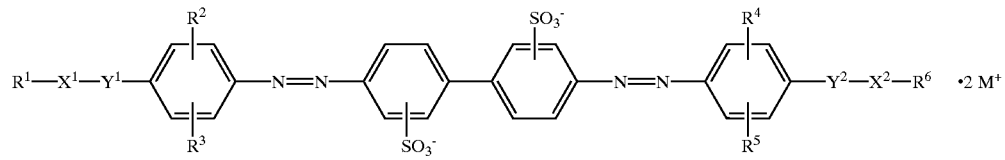

wherein $R^1$ and $R^6$ each independently represent a polymerizable group selected from the group consisting of a (meth)acryloyl group, a (meth)acryloyloxy group, a (meth)acrylamide group, a vinyl group, and a vinyloxy group; $X^1$ and $X^2$ each independently represent (1) a direct bond, (2) an alkylene or a phenylene group having 1 to 18 carbon atoms, or (3) a linker group in which the alkylene group and the phenylene group (2) are combined via a direct bond, an ester bond, an ether bond, an imide bond, or an amide bond; $Y^1$ represents a direct bond when $X^1$ is a direct bond; $Y^2$ represents a direct bond when $X^2$ is a direct bond; $Y^1$ and $Y^2$ each independently represent a direct bond, an ester bond, an ether bond, an imide bond, or an amide bond when $X^1$ and $X^2$ represent a linker group other than the direct bond; $R^2$, $R^3$, $R^4$, and $R^5$ each independently represent hydrogen, halogen, a carboxyl group, a methyl halide group, a methoxy halide group, a cyano group, or a hydroxyl group; and M represents hydrogen, an alkali metal, or $NH_4$.

Among the polymerizable groups described above, a (meth)acryloxy group and a (meth)acrylamide group are preferred as $R^1$ and $R^6$ in the general formula (1).

Specific examples of $R^2$, $R^3$, $R^4$, and $R^5$ in the general formula (1) include hydrogen; halogens such as fluorine, chlorine, bromine, or iodine; carboxyl groups; methyl halide groups such as a fluoromethyl group, a difluoromethyl group, a trifluoromethyl group, or a chloromethyl group; methoxy halide groups such as a fluoromethoxy group, a trifluoromethoxy group, or a chloromethoxy group; a cyano group; and a hydroxyl group. Among these groups, carboxyl groups and trifluoromethyl groups are particularly preferred.

Examples of M in the general formula (1) include a hydrogen atom; alkali metal atoms such as lithium, sodium, or potassium atoms; and $NH_4$. Among these, sodium atom is preferred.

The azo dye having a polymerizable group represented by the general formula (1) can be easily synthesized by the following method. That is, a diazonium salt is synthesized by a diazotization reaction between benzidine-3,3'-disulfonic acid and sodium nitrite. A 4,4'-bis(4-hydroxy-3-trifluoromethylphenyl-1-azo)biphenyl-3,3'-disulfonic acid disodium salt is synthesized by reacting o-trifluoromethylphenol with a diazonium salt mixture. The azo dye having a hydroxyl group thus obtained is reacted with a carboxylic acid having a polymerizable group, carboxylic acid chloride having a polymerizable group, or carboxylic anhydride having a polymerizable group by a publicly known method, thereby synthesizing an azo dye having a polymerizable group represented by the general formula (1).

The azo dye having a polymerizable group represented by the general formula (1) exhibits high solubility in water or a polar organic solvent and exhibits a good affinity to a substrate such as glass because it has a sulfo group or a salt thereof. Therefore, a coating layer, which has mechanical and long-term stability, can be formed on a substrate such a glass only by coating a material for a photo-alignment layer, which is prepared by dissolving the azo dye having a polymerizable group represented by the general formula (1) in water or a polar organic solvent, on the substrate and removing the water or polar organic solvent.

Exposure of an unpolymerized coating layer made of the material for a photo-alignment layer containing an azo dye having a polymerizable group, which was formed on a substrate such as glass, to polarized light selectively excites a structural unit having an electronic transition moment in the same direction as that of an electric vector of polarized light and reorients the electronic transition moment of the molecule so as not to coincide with the direction of the electric vector of polarized light. Consequently, anisotropy arises in the coating layer, thereby enabling the coating layer to carry out a photo-alignment function.

Because there are two polymerizable groups per molecule, the azo dye represented by the general formula (1) is easily polymerized, thereby making it possible to fix the structural unit in the coating layer, which achieved anisotropy by exposure to polarized light, and to retain anisotropy for a long period, and thus a stable liquid crystal alignment layer can be obtained.

Among the anthraquinone dyes having at least two polymerizable groups per molecule, which are used in the method of manufacturing a photo-alignment layer of the present invention, an anthraquinone dye represented by the general formula (2) is preferred:

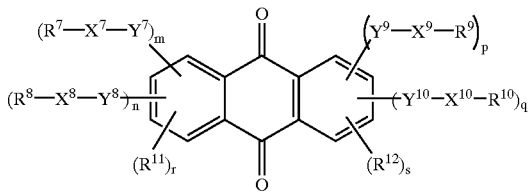

wherein $R^7$, $R^8$, $R^9$, and $R^{10}$ each independently represent a polymerizable group selected from the group consisting of a (meth)acryloyl group, a (meth)acryloyloxy group, a (meth)acrylamide group, a vinyl group, and a vinyloxy group; each independently represent a direct bond, an alkylene group, or a phenylene group; $Y^7$, $Y^8$, $Y^9$, and $Y^{10}$ represent a direct bond when $X^7$, $X^8$, $X^9$, and $Y^{10}$ represent a direct bond; $Y^7$, $Y^8$, $Y^9$, and $Y^{10}$ each independently represent a direct bond, an ester bond, an ether bond, an imide bond, or an amide bond when $X^7$, $X^8$, $X^9$, and $X^{10}$ each independently represent an alkylene group or a phenylene group; m, n, p, and q each independently represent an integer of 0 to 4, provided that the sum total of m, n, p, and q is from 2 to 4; $R^{11}$ and $R^{12}$ represent a group selected from the group consisting of a hydroxyl group, a nitro group, a sulfo group, an amino group, a carboxyl group, a mercapto group, and a carbamoyl group; and r and s each independently represent an integer of 0 to 4, provided that the sum total of r and s is from 0 to 6.

Among those described above, any of $R^7$—$X^7$—$Y^7$—, $R^8$—$X^8$—$Y^8$—, $R^9$—$X^9$—$Y^9$—, and $R^{10}$—$X^{10}$—$Y^{10}$— is preferably a (meth)acryloyl group, a (meth)acryloyloxy group, or a (meth)acrylamide group, and particularly preferably a (meth)acryloyloxy group or a (meth)acrylamide group.

Among the anthraquinone dyes represented by the general formula (2), a dye having a hydroxyl group, a nitro group, a sulfo group, an amino group, a carboxyl group, a mercapto group, or a carbamoyl group exhibits good solubility in water or a polar organic solvent. Among the anthraquinone dyes represented by the general formula (2), a dye in which $R^{11}$ and $R^{12}$ represent a hydroxyl group, a sulfo group, or a carboxyl group is preferred because the affinity to a substrate such as glass is improved, and a uniform coating layer can be obtained. Furthermore, a dye in which $R^{11}$ and $R^{12}$ represent a hydroxyl group or a sulfo group is particularly preferred.

The anthraquinone dye represented by the general formula (2) can be easily synthesized by reacting an anthraquinone dye having a hydroxyl group or an amino group with a carboxylic acid having a polymerizable group, a carboxylic acid chloride having a polymerizable group, or a carboxylic anhydride having a polymerizable group by a publicly known method. The anthraquinone dye having a hydroxyl group or an amino group can also be easily synthesized from the anthraquinone dye by a publicly known method.

The anthraquinone dye represented by the general formula (2) exhibits high solubility in water or a polar organic solvent and exhibits a good affinity to a substrate such as glass. Therefore, similar to the material for the photo-alignment layer, which contains an azo dye represented by the general formula (1), exposure of an unpolymerized coating layer made of the material for the photo-alignment layer containing an azo dye having a polymerizable group to polarized light selectively excites the structural unit having an electronic transition moment in the same direction as that of an electric vector of polarized light and reorients the electronic transition moment of the molecule to the direction which reduces light absorption. Consequently, anisotropy arises in the coating layer, thereby enabling the coating layer to carry out a photo-alignment function. Because of the polymerizable group, the anthraquinone dye can be easily polymerized by exposure to light or heating, thereby making it possible to fix the structural unit in the coating layer, which achieved anisotropy by exposure to polarized light, and to retain anisotropy for a long period, and thus a stable liquid crystal alignment layer can be obtained.

The material for the photo-alignment layer used in the method of manufacturing is used after dissolving in an appropriate solvent. Examples of the solvent which enables the material for the photo-alignment layer to exhibit good solubility include, but are not limited to, N-methylpyrrolidone, dimethylformamide, butylcellosolve, γ-butyrolactone, chlorobenzene, dimethyl sulfoxide, dimethylacetamide, and tetrahydrofuran. Among these solvents, N-methylpyrrolidone, butylcellosolve, γ-butyrolactone, and dimethylformamide are particularly preferred because the coatability of the solution of the material for the photo-alignment layer to a substrate such as glass is good, and a uniform layer can be obtained.

The photo-alignment layer can be manufactured by coating the solution of the material for the photo-alignment layer onto the substrate by a method such as spin coating or a printing method, drying the coating layer, and conducting photo-alignment operation and the polymerization of the polymerizable group.

The substrate used in the present invention is a substrate which is conventionally used in the liquid crystal display device and has enough heat resistance to withstand heating in the case of drying after coating the alignment layer or bonding upon assembling of the liquid crystal device. A glass substrate can be such a substrate.

The term "photo-alignment operation" refers to an operation of imparting a photo-alignment function by exposure to polarized light. A wavelength, which enables the dichroic dye used in the present invention to have light absorption, is selected as the wavelength of the polarized light, and examples of light having such a wavelength include visible and UV light. Particularly, UV light having a wavelength within a range from about 300 to 400 nm is preferred. Examples of the polarized light used in photo-alignment include linearly polarized light and elliptically polarized light, and linearly polarized light obtained by passing light from a UV light source, such as Xenon lamp, high-pressure mercury lamp, or metal halide lamp, through a polarizing filter or a polarizing prism such as Glan-Thompson polarizing prism or Glan-Taylor polarizing prism is preferable. To obtain a pretilt angle of the liquid crystal, a method of exposure to polarized light in a direction oblique to the substrate, and a method of exposure to non-polarized light in an oblique direction after exposure to polarized light may be used.

The polymerization operation is generally conducted due to exposure to UV light or heating after the photo-alignment operation. If necessary, a polymerization initiator can also be added to the material for the photo-alignment layer.

In the case of the polymerization due to light exposure, a photopolymerization initiator is preferably used as the polymerization initiator. As the photopolymerization initiator, conventionally known ones can be used, and examples thereof include 2-hydroxy-2-methyl-1-phenylpropan-1-one (DAROCURE 1173, manufactured by Merck Co.), 1-hydroxycyclohexyl phenyl ketone (IRGACURE 184, manufactured by Ciba-Geigy Corporation), 1-(4-isopropylphenyl)-2-hydroxy-2-methylpropan-1-one (DAROCURE 1116, manufactured by Merck Co.), 2-methyl-1-[(methylthio)phenyl]-2-morpholinopropane-1 (IRGACURE 907, manufactured by Ciba-Geigy Corporation), benzyl dimethyl ketal (IRGACURE 651, manufactured by Ciba-Geigy Corporation), a mixture of 2,4-diethyloxanthone (KAYACURE DETX, manufactured by Nippon Kayaku Co., Ltd.) and ethyl p-dimethylaminobenzoate (KAYACURE EPA, manufactured by Nippon Kayaku Co., Ltd.), and acylphosphine oxide (LUCIRIN TPO, manufactured by BASF Corporation) as a mixture of isopropylthioxanthone (CANTACURE DETX, manufactured by Wordprekinsop Co.) and ethyl p-dimethylaminobenzoate.

In the case of the polymerization due to heating, a thermal polymerization initiator is preferably used as the polymerization initiator. As the thermal polymerization initiator, conventionally known ones can be used, and examples thereof include peroxides such as benzoyl peroxide, 2,4-dichlorobenzoyl peroxide, 1,1-di(tertiary-butylperoxy)-3,3,5-trimethylcyclohexane, n-butyl-4,4'-di(tertiary-butylperoxy)valerate, and dicumyl peroxide; azo compounds such as 7-azobisisobutyronitrile; and tetramethylthiuram disulfide.

When the polymerization operation is conducted by light exposure, in order to prevent the aligned state of the material for the photo-alignment layer, which has already been obtained, from being disturbed, it is preferable for exposure to light having a wavelength which is not absorbed by the structural unit (this structural unit corresponds to an azobenzene skeleton in the azo dye, or an anthraquinone skeleton in the anthraquinone dye) which exhibits anisotropic light absorption of the dichroic dye, that is, light having a wavelength which is different from that capable of imparting the liquid crystal alignment capability. Specifically, it is preferable to expose to non-polarized UV light having a wavelength within a range from 200 to 320 nm. When the polymerization operation is conducted by heating, the substrate subjected to the photo-alignment operation by coating the material for the photo-alignment layer as described above is heated. The heating temperature is preferably within a range from 100 to 300° C., and more preferably from 100 to 200° C.

One embodiment of the method of manufacturing a liquid crystal display device using the photo-alignment layer made by the method of manufacturing a photo-alignment layer of the present invention will now be described below. A solution of a material for the photo-alignment layer of the present invention is coated to each surface of two glass substrates provided with ITO transparent electrodes and dried, and then the photo-alignment operation and polymerization operation were conducted to make a photo-alignment layer. The surfaces provided with the photo-alignment layer are faced via a spacer so that their exposed light polarization directions are perpendicular to each other, and then a liquid crystal is injected between the space. A polarizing plate is attached to the outside of the liquid crystal cell thus obtained so that the alignment direction of the photo-alignment layer agrees with the transmitting polarizing direction in each substrate, thereby making it possible to manufacture a liquid crystal display device.

The dichroic dye having a polymerizable group used in the present invention has the feature that it exhibits high solubility in water or a polar organic solvent and exhibits a good affinity to a glass substrate or a transparent electrode made of oxide such as ITO. Therefore, a stable coating layer can be obtained by coating the material for the photo-alignment layer used in the present invention on the glass substrate and drying the solvent. A portion of the material for the photo-alignment layer does not diffuse into the liquid crystal and thus the characteristics of the liquid crystal display device (e.g., liquid crystal alignment capability, voltage holding ratio) are not likely to deteriorate. Since the material for the photo-alignment layer used in the present invention has a polymerizable group, the aligned state can be fixed by conducting the polymerization treatment after the alignment operation, thereby making it possible to solve the problem that a conventional photo-alignment layer is unstable to light exposure.

EXAMPLES

The following Synthesis Examples, Examples, and Comparative Examples further illustrate the present invention in detail, but the present invention is not limited by these Examples.

Synthesis Example 1

An aqueous solution of 0.28 g (0.004 mol) of sodium nitrite was added to 0.69 g (0.002 mol) of benzidine-3,3'-disulfonic acid, and 3.0 ml (0.0024 mol) of 3% hydrochloric acid was added dropwise while stirring the mixture, and then a diazotization reaction was conducted. 10 ml of an aqueous 5% sodium carbonate solution was mixed with 0.65 g (0.004 mol) of o-trifluoromethylphenol, and, while cooling the mixture in an ice bath and stirring, the diazonium salt mixture obtained by the method described above was gradually added dropwise, and the reaction was continued for 4 hours. After the completion of the reaction, the precipitate was collected by filtration and washed with heated chloroform and acetone to obtain 0.75 g (yield: 51%) of a 4,4'-bis(4-hydroxy-3-trifluoromethylphenyl-1-azo) biphenyl-3,3'-disulfonic acid disodium salt. 0.22 g (0.0003 mol) of the azo dye thus obtained was mixed with 10 ml of pyridine, followed by stirring. After adding 0.063 g (0.0006 mol) of methacrylic acid chloride to the mixture, the reaction was continued under reflux for 3 hours. The reaction product was cooled to room temperature, followed by the addition of ethanol and further filtration to obtain a precipitate. After ethanol was further added to the reaction product, the solution was boiled by heating and filtered again to obtain a precipitate, which was immediately dried in air. Consequently, 0.16 g (yield: 63%) of a compound represented by the formula (3);

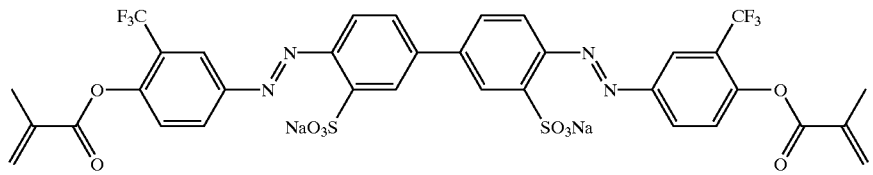

was obtained.

Synthesis Example 2

An aqueous solution of 0.28 g (0.004 mol) of sodium nitrite was added to 0.69 g (0.002 mol) of benzidine-3,3'-disulfonic acid, and then 3 ml (0.0024 mol) of 3% hydrochloric acid was added dropwise while stirring the mixture, and then a diazotization reaction was conducted. 10 ml of an aqueous 5% sodium carbonate solution was mixed with 0.55 g (0.004 mol) of 3-hydroxybenzoic acid, and, while cooling the mixture in an ice bath and stirring, the diazonium salt mixture obtained by the method described above was gradually added dropwise, and the reaction was conducted for 4 hours. After the completion of the reaction, the precipitate was collected by filtration and washed with heated chloroform and acetone to obtain 0.77 g (yield: 56%) of a 4,4'-bis(4-hydroxy-2-carboxyphenyl-1-azo)biphenyl-3,3'-disulfonic acid disodium salt. 0.21 g (0.0003 mol) of the azo dye thus obtained was mixed with 10 ml of pyridine, followed by stirring. After adding 0.063 g (0.0006 mol) of methacrylic acid chloride to the mixture, the reaction was continued under reflux for 3 hours. The reaction product was cooled to room temperature, followed by the addition of ethanol and further filtration to obtain a precipitate. After ethanol was further added to the reaction product, the solution was boiled by heating and filtered again to obtain a precipitate, which was immediately dried in air. Consequently, 0.15 g (yield: 62%) of a compound represented by the formula (4):

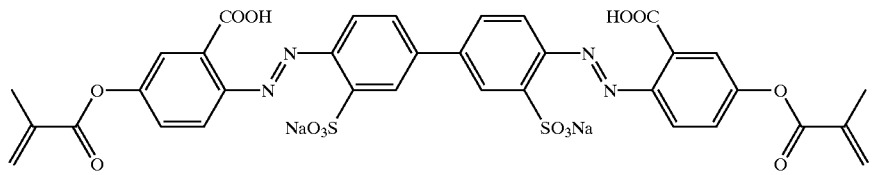

was obtained

Synthesis Example 3

2.7 g (0.01 mol) of 1,8-dihydroxy-4,5-diaminoanthraquinone and 6.27 g (0.06 mol) of methacrylic acid chloride were added to 30 ml of pyridine, and the reaction was continued under reflux for 30 minutes. The reaction product was cooled to room temperature and poured into 100 ml of 5% diluted hydrochloric acid, and then the solution was filtered. The resulting precipitate was washed with water and then dried. The product thus obtained was dissolved in chloroform and then purified by column chromatography using silica gel as the stationary phase and chloroform as the mobile phase to obtain 2.8 g (yield: 53%) represented by the formula (5):

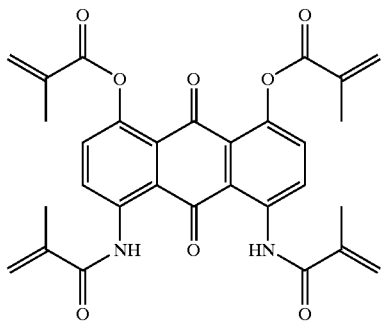

Synthesis Example 4

In the same manner as in Synthesis Example 3, except that 2.5 g (0.01 mol) of 1-hydroxy-4,5-diaminoanthraquinone and 3.76 g (0.036 mol) of methacrylic acid chloride were

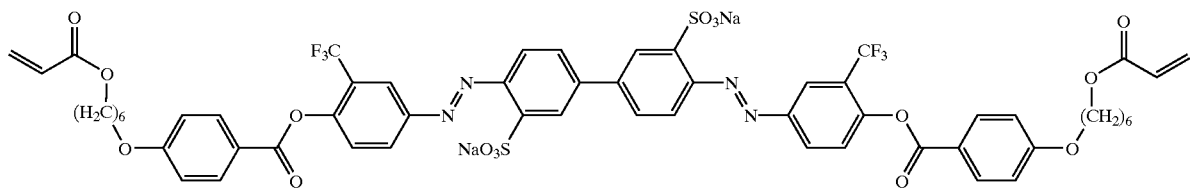

used, 1.99 g (yield: 42%) of a compound represented by the formula (6):

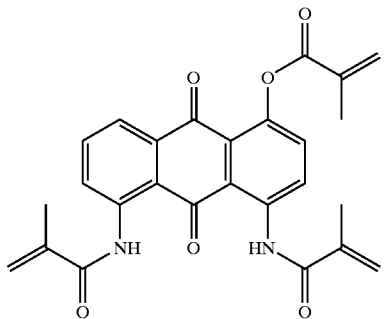

was obtained.

Synthesis Example 5

2.7 g (0.01 mol) of 1,8-dihydroxy-4,5-diaminoanthraquinone and 2.6 g (0.025 mol) of methacrylic acid chloride were mixed with 20 ml of chlorobenzene, and the reaction was continued under reflux for 30 minutes. The reaction product was cooled to 60° C., and 30 ml of ethanol was added thereto while stirring. This mixture was once heated to a boiling point and then cooled to 20° C. The resulting precipitate was collected by filtration, washed with ethanol, dissolved in chloroform and then purified by column chromatography using silica gel as the stationary phase and chloroform as the mobile phase to obtain 2.7 g (yield: 67%) represented by the formula (7):

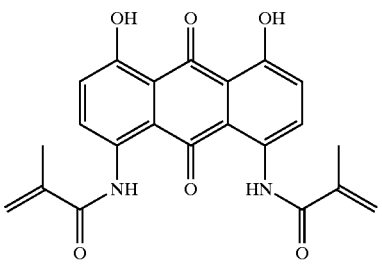

Synthesis Example 6

0.22 g (0.0003 mol) of 4,4'-bis(4-hydroxy-3-trifluoromethylphenyl-1-azo)biphenyl-3,3'-disulfonic acid disodium salt was added to 10 ml of pyridine, and followed by stirring. To the solution, 0.19 g (0.0006 mol) of p-(acryloyl-n-hexyloxy)benzoic acid chloride and 0.005 g of hydroquinone were added, and the reaction was continued while stirring at 60° C. for 5 hours. After the reaction product was cooled, the precipitate was collected by filtration, washed with 30 ml of ethanol and then dried in air to obtain 0.22 g (yield: 58%) represented by the formula (8):

Comparative Synthesis Example 1

An aqueous solution of 0.28 g (0.004 mol) of sodium nitrite was added to 0.69 g (0.002 mol) of benzidine-3,3'-disulfonic acid, and then 3.0 ml (0.0024 mol) of 3% hydrochloric acid was added dropwise while stirring the mixture, and then a diazotization reaction was conducted. 10 ml of an aqueous 5% sodium carbonate solution was mixed with 0.65 g (0.004 mol) of o-trifluoromethylphenol, and, while cooling the mixture in an ice bath and stirring, the diazonium salt mixture obtained by the method described above was gradually added dropwise, and the reaction was conducted for 4 hours. After the completion of the reaction, the precipitate was collected by filtration and washed with heated chloroform and acetone to obtain 0.75 g (yield: 51%) of a compound represented by the formula (9):

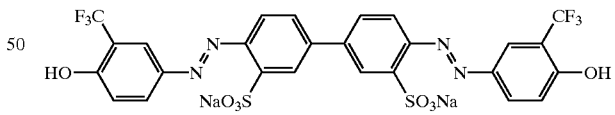

Comparative Synthesis Example 2

8 g of N-methyl-2-pyrrolidone, 0.348 g of 1-(2,4-diaminophenoxy)-2-[4-(phenylazo)phenoxy]-ethane and 0.198 g of 4,4'-diaminodiphenylmethane were mixed. While cooling the mixture in an ice bath, 0.821 g of ethylene glycol bis(trimellitic anhydride) was added to the mixture in several portions. After the completion of the dropwise addition, the reaction was continued while cooling in an ice bath to obtain a solution of polyamide acid.

Examples 1 to 8

Using materials for the photo-alignment layer made of the compounds obtained in Synthesis Examples 1 to 6, photo-alignment layers were formed, and the voltage holding ratio and durability were evaluated. The specific test procedure is shown below.

Method of Making Photo-Alignment Layer a-1. Preparation of Photo-Alignment Material Solution (for Photopolymerization)

To 99 parts by weight of each of the compounds obtained in the Synthesis Examples and Comparative Synthesis Examples, 1 part by weight of a photopolymerization initiator "IRGACURE-651" (manufactured by Ciba-Geigy Corporation), and the mixture was dissolved in dimethylformamide to give a solution having a nonvolatile content of 5% by weight, which was filtered with a filter having a pore size of 0.1 μm to obtain a solution of a material for a photo-alignment layer.

a-2. Preparation of Photo-Alignment Material Solution (for Thermal Polymerization)

To 99 parts by weight of each of the compounds obtained in the Synthesis Examples and Comparative Synthesis Examples, 1 part by weight of a thermal polymerization initiator "ABN-E" (manufactured by JAPAN HYDRAZINE COMPANY, INC.), and the mixture was dissolved in dimethylformamide to give a solution having a nonvolatile content of 5% by weight, which was filtered with a filter having a pore size of 0.1 μm to obtain a solution of a material for a photo-alignment layer.

b. Formation of Photo-Alignment Layer b-1. Photopolymerization Method

The solution of the material for the photo-alignment layer obtained by the method of (a-1) was uniformly coated on a glass substrate with an ITO electrode by a spin coater and dried at 100° C. for 15 minutes, and then the surface of the coating layer was exposed to linearly polarized UV light at about 365 nm from an ultra-high pressure mercury lamp at a total energy of 30 J/cm$^2$ in a direction perpendicular to a substrate, and thus the photo-alignment operation was conducted. Then, the same surface was exposed to non-polarized UV light at about 313 nm from an ultra-high pressure mercury lamp at a total energy of 50 J/cm$^2$ in a direction perpendicular to a substrate, and thus the polymerization operation of the aligned coating film for the photo-alignment layer was conducted.

b-2. Thermal Polymerization Method

The solution of the material for the photo-alignment layer obtained by method (a-2) was uniformly coated on a glass substrate with an ITO electrode by a spin coater, dried and then cured at 100° C. for 15 minutes, and then the surface of the coating layer was exposed to linearly polarized UV light at about 365 nm from an ultra-high pressure mercury lamp at a total energy of 30 J/cm$^2$ in a direction perpendicular to a substrate, and thus the photo-alignment operation was conducted. Then, the glass substrate was heated in an oven at 190° C. for 1 hour, and thus the polymerization operation of the coating film for the photo-alignment layer was conducted.

c. Formation of Liquid Crystal Cell

An epoxy adhesive containing styrene beads having a diameter of 8 μm was coated around the periphery of one of the substrate coated by the photo-alignment layer obtained in (b-1) or (b-2), with the exception of a liquid crystal injection hole. Another substrate coated by the photo-alignment layer was laid on the substrate so that the alignment surfaces faced each other, and that the plane of polarization of the exposed photo-alignment layer on one substrate was at a right angle to that of the other substrate, and then the adhesive was cured at 150° C. over 90 minutes. The liquid crystal cell was filled with a nematic liquid crystal (5CB) in an isotropic phase by injecting it under a vacuum through the liquid crystal injection hole, and then the liquid crystal injection hole was sealed with an epoxy adhesive.

Method of Evaluating Photo-Alignment Layer

A. Evaluation of Liquid Crystal Alignment Property

In the evaluation of the liquid crystal alignment property, a polarizing microscope equipped with a photomultiplier in a cross-nicol state was used. An output from the photomultiplier was reduced so that the transmittance is 0% when light from a tungsten lamp source of the polarizing microscope is completely screened, while the transmittance is 100% when a sample is not placed on a sample stage. After the liquid crystal cell obtained in method (c) was arranged in the direction where the transmittance was maximum in state in which no voltage was applied, a voltage within a range from 0 to 5 V was applied, and sweeped, thereby determining the voltage-transmittance (V-T) curve. The liquid crystal alignment property was evaluated by a contrast ratio represented by the following formula:

Contrast ratio=Light transmittance upon application of 4 V/Light transmittance upon application of 0 V.

Alternatively, the liquid crystal alignment property was visually evaluated.

B. Measurement of Voltage Holding Ratio

To the liquid crystal cell obtained by method (c), a DC voltage of 5 V was applied for 64 microseconds, and then a holding ratio of the voltage after opening for 16.6 milliseconds to the initially applied voltage was measured.

C. Evaluation of Heat Durability

After the liquid crystal cell obtained by method (c) was heated at 80° C. for 1000 hours, the alignment property was judged in terms of the contrast ratio and by visual observation, and the heat durability was evaluated.

D. Evaluation of Light Durability

After the liquid crystal cell obtained by method (c) was exposed to linearly polarized UV light from an ultra-high pressure mercury lamp at a total energy of 50 J/cm$^2$ in an arbitrary direction, the alignment property was judged in terms of the contrast ratio and by visual observation, and the light durability was evaluated.

Comparative Example 1

The compound of the formula (9) obtained in Comparative Synthesis Example 1 was dissolved in dimethylformamide to give a solution having a nonvolatile content of 5% by weight, which was filtered with a filter having a pore size of 0.1 μm to obtain a solution of a material for a photo-alignment layer. Using the same method of making the photo-alignment layer shown in Examples 1 to 8, except that the polymerization operation was not conducted by means of light or heat, coating onto the substrate and exposure to linearly polarized UV light were conducted to make a photo-alignment layer. Using the resulting substrate with the photo-alignment layer, a liquid crystal cell was made according to the method shown in Examples 1 to 8, and then evaluated.

Comparative Example 2

Polyamide acid obtained in Comparative Synthesis Example 2 was dissolved in dimethylformamide to give a solution having a nonvolatile content of 5% by weight, which was filtered with a filter having a pore size of 0.1 μm to obtain a solution of a material for a photo-alignment layer. The resulting solution was coated on a glass substrate with an ITO electrode by a spin coater and dried at 70° C. for 1 minute to form a resin layer. The surface of the resulting coating layer was exposed to linearly polarized UV light at about 365 nm from an ultra-high pressure mercury lamp at a total energy of 30 J/cm², and thus the photo-alignment operation was conducted. Using the resulting substrate with the photo-alignment layer, a liquid crystal cell was made according to the method shown in Examples 1 to 8, and then evaluated.

Evaluation Results

The evaluation results of the liquid crystal alignment property, the voltage holding ratio and the durability are summarized in Table 1 and Table 2. The results of visual evaluation are shown in Table 1, while the results of evaluation by the contrast ratio are shown in Table 2. In the visual evaluation, samples which exhibited good alignment in a unidirection were rated "○", while samples where defects arose or the alignment direction varied with the location were rated "X". The larger the value of the contrast ration, the better the alignment property.

TABLE 1

Results of visual evaluation

| Examples | Related Synthesis Examples | Polymerization method | Liquid crystal alignment property | | | Voltage holding ratio |
|---|---|---|---|---|---|---|
| | | | Initial | After heat durability test | After light durability test | |
| Example 1 | Synthesis Example 1 | Photopolymerization | ○ | ○ | ○ | 99.0% |
| Example 2 | Synthesis Example 1 | Thermal polymerization | ○ | ○ | ○ | 99.2% |
| Example 3 | Synthesis Example 2 | Photopolymerization | ○ | ○ | ○ | 99.1% |
| Example 4 | Synthesis Example 3 | Photopolymerization | ○ | ○ | ○ | 99.2% |
| Example 5 | Synthesis Example 3 | Thermal polymerization | ○ | ○ | ○ | 99.1% |
| Example 6 | Synthesis Example 4 | Photopolymerization | ○ | ○ | ○ | 99.0% |
| Example 7 | Synthesis Example 5 | Photopolymerization | ○ | ○ | ○ | 99.2% |
| Example 8 | Synthesis Example 6 | Photopolymerization | ○ | ○ | ○ | 99.0% |
| Comp. Example 1 | Comp. Synthesis Example 1 | None | ○ | X | X | 98.7% |
| Comp. Example 2 | Comp. Synthesis Example 2 | None | ○ | ○ | X | 98.5% |

TABLE 2

Results of evaluation by contrast ratio

| Examples | Related Synthesis Examples | Polymerization method | Liquid crystal alignment property | | |
|---|---|---|---|---|---|
| | | | Initial | After heat durability test | After light durability test |
| Example 1 | Synthesis Example 1 | Photopolymerization | 54.3 | 54.2 | 54.0 |
| Example 2 | Synthesis Example 1 | Thermal polymerization | 55.0 | 54.8 | 54.8 |
| Example 3 | Synthesis Example 2 | Photopolymerization | 54.8 | 54.2 | 54.3 |
| Example 4 | Synthesis Example 3 | Photopolymerization | 53.9 | 53.9 | 53.7 |
| Example 5 | Synthesis Example 3 | Thermal polymerization | 54.0 | 53.8 | 53.8 |
| Example 6 | Synthesis Example 4 | Photopolymerization | 55.3 | 55.1 | 55.0 |
| Example 7 | Synthesis Example 5 | Photopolymerization | 53.1 | 53.0 | 52.7 |
| Example 8 | Synthesis Example 6 | Photopolymerization | 54.0 | 54.0 | 53.7 |
| Comp. Example 1 | Comp. Synthesis Example 1 | None | 56.7 | 5.5 | 3.1 |
| Comp. Example 2 | Comp. Synthesis Example 2 | None | 21.2 | 20.5 | 2.1 |

What is claimed is:

1. A method of manufacturing a photo-alignment layer, which comprises coating a material for the photo-alignment layer, which contains a dichroic dye having two or more polymerizable groups per molecule, on a substrate, exposing the coating layer containing the dichroic dye to polarized light, thereby imparting a photo-alignment function to the coating layer, and then polymerizing the polymerizable groups by heating or light exposure.

2. The method of manufacturing a photo-alignment layer according to claim 1, wherein the dichroic dye is an azo dye having two or more polymerizable groups per molecule or an anthraquinone dye having two or more polymerizable groups per molecule.

3. The method of manufacturing a photo-alignment layer according to claim 2, wherein the azo dye is an azo dye represented by the general formula (1):

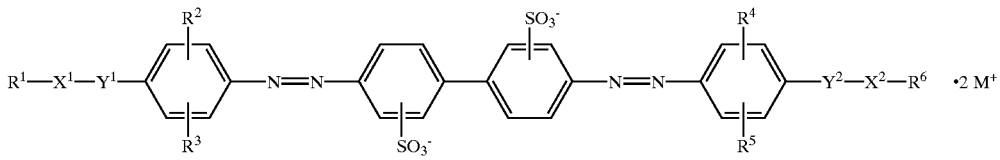

wherein $R^1$ and $R^6$ each independently represent a polymerizable group selected from the group consisting of a (meth)acryloyl group, a (meth)acryloyloxy group, a (meth)acrylamide group, a vinyl group, and a vinyloxy group; $X^1$ and $X^2$ each independently represent (1) a direct bond, (2) an alkylene or a phenylene group having 1 to 18 carbon atoms, or (3) a linker group in which the alkylene group and the phenylene group (2) are combined via a direct bond, an ester bond, an ether bond, an imide bond, or an amide bond; $Y^1$ represents a direct bond when $X^1$ is a direct bond; $Y^2$ represents a direct bond when $X^2$ is a direct bond; $Y^1$ and $Y^2$ each independently represent a direct bond, an ester bond, an ether bond, an imide bond, or an amide bond when $X^1$ and $X^2$ represent a linker group other than the direct bond; $R^2$, $R^3$, $R^4$, and $R^5$ each independently represent hydrogen, a halogen, a carboxyl group, a methyl halide group, a methoxy halide group, a cyano group, or a hydroxyl group; and M represents hydrogen, an alkali metal, or $NH_4$.

4. The method of manufacturing a photo-alignment layer according to claim 3, wherein the dichroic dye represented by the general formula (1) is a compound in which $R^1$ and $R^6$ represent a (meth)acryloyloxy group; $R^2$, $R^3$, $R^4$, and $R^5$ represent a trifluoromethyl group, a carboxyl group, or hydrogen; and M represents sodium.

5. The method of manufacturing a photo-alignment layer according to claim 4, wherein the dichroic dye represented by the general formula (1) is a compound in which $X^1$ and $X^2$ represent an alkyleneoxyphenylene; and $Y^1$ and $Y^2$ represent an ester bond.

6. The method of manufacturing a photo-alignment layer according to claim 2, wherein the anthraquinone dye is an anthraquinone dye having a polymerizable group represented by the general formula (2):

wherein $R^7$, $R^8$, $R^9$, and $R^{10}$ each independently represent a polymerizable group selected from the group consisting of a (meth)acryloyl group, a (meth)acryloyloxy group, a (meth)acrylamide group, a vinyl group, and a vinyloxy group; $X^7$, $X^8$, $X^9$, and $X^{10}$ each independently represent a direct bond, an alkylene group, or a phenylene group; $Y^7$, $Y^8$, $Y^9$, and $Y^{10}$ represent a direct bond when $X^7$, $X^8$, $X^9$, and $X^{10}$ represent a direct bond; $Y^7$, $Y^8$, $Y^9$, and $Y^{10}$ each independently represent a direct bond, an ester bond, an ether bond, an imide bond, or an amide bond when $X^7$, $X^8$, $X^9$, and $X^{10}$ each independently represent an alkylene group or a phenylene group; m, n, p, and q each independently represent an integer of 0 to 4, provided that the sum total of m, n, p, and q is from 2 to 4; $R^{11}$ and $R^{12}$ represent a group selected from the group consisting of a hydroxyl group, a nitro group, a sulfo group, an amino group, a carboxyl group, a mercapto group, and a carbamoyl group; and r and s each independently represent an integer of 0 to 4, provided that the sum total of r and s is from 0 to 6.

7. The method of manufacturing a photo-alignment layer according to claim 6, wherein the anthraquinone dye represented by the general formula (2) is a compound in which $R^7$, $R^8$, $R^9$ and $R^{10}$ represent a (meth)acryloyloxy group or a (meth)acrylamide group; $X^7$, $X^8$, $X^9$, $X^{10}$, $Y^7 Y^8$, $Y^9$, and $Y^{10}$ represent a direct bond; m, n, p, and q represent 0 or 1; $R^{11}$ and $R^{12}$ represent a hydroxyl group; and r and s represent 0 or 1, provided that the sum total of r and s is from 0 to 2.

* * * * *